United States Patent
Fischbach

(10) Patent No.: US 6,875,006 B2
(45) Date of Patent: Apr. 5, 2005

(54) THREADED DRIVE

(75) Inventor: Gunther Fischbach, Fürstenfeldbruck (DE)

(73) Assignee: Mannesmann Plastics Machinery GmbH, München (DE)

( * ) Notice: Subject to any disclaimer, the term of this patent is extended or adjusted under 35 U.S.C. 154(b) by 99 days.

(21) Appl. No.: 10/451,433

(22) PCT Filed: Dec. 20, 2001

(86) PCT No.: PCT/EP01/15173
§ 371 (c)(1),
(2), (4) Date: Jun. 24, 2003

(87) PCT Pub. No.: WO02/053950
PCT Pub. Date: Jul. 11, 2002

(65) Prior Publication Data
US 2004/0050193 A1 Mar. 18, 2004

(30) Foreign Application Priority Data
Dec. 29, 2000 (DE) .......................... 100 65 291

(51) Int. Cl.⁷ .......................... B29C 45/66; F16H 25/22
(52) U.S. Cl. .................. 425/589; 74/89.39; 74/424.81; 425/451.7
(58) Field of Search ................................. 425/589, 595, 425/450.1, 451.7, 451.9; 74/89.39, 424.81

(56) References Cited

U.S. PATENT DOCUMENTS

| | | | |
|---|---|---|---|
| 2,623,403 A | * 12/1952 | Terdina | .................... 74/89.39 |
| 4,984,980 A | * 1/1991 | Ueno | .......................... 425/595 |
| 5,378,141 A | 1/1995 | Aoki | |
| 5,426,989 A | 6/1995 | Uhlmann et al. | |
| 5,811,139 A | * 9/1998 | Hehl | ........................... 425/595 |
| 6,468,449 B1 | * 10/2002 | Fujikawa | ..................... 425/595 |

FOREIGN PATENT DOCUMENTS

| DE | 44 11 651 C1 | 4/1995 |
|---|---|---|
| DE | 295 06 066 | 7/1995 |

* cited by examiner

Primary Examiner—James P. Mackey
(74) Attorney, Agent, or Firm—Henry M. Feiereisen

(57) ABSTRACT

The invention relates to a screw mechanism comprised of a screw shaft (1), a screw nut (2) and rolling bodies. When the screw mechanism is subjected to a high static load, the forces are transmitted from the screw shaft (1) to the screw nut (2) by means of the rolling bodies. As the contact surfaces between the rolling bodies, the screw nut (2) and the screw shaft (1) are very small, only relatively weak forces can be transmitted. In order to adapt the screw mechanism to high static loads, using simple construction measures, the surface of the screw shaft (1) between the grooves (4) of the rolling bodies is provided with locking structures which can be form-fittingly connected with complementary locking structures of locking elements (7, 8) which are moveable essentially transversally to the axis of the screw shaft (1).

15 Claims, 1 Drawing Sheet

THREADED DRIVE

BACKGROUND OF THE INVENTION

The invention relates to a screw mechanism.

Screw mechanisms of this type, like e.g. ball screw mechanisms, are well suited for implementing rapid adjustment motions under a relatively slight load. However, when a transmission of high static loads is involved, a screw mechanism with rolling bodies is less suitable because the force transmission is realized across very small contact surfaces between rolling body and rolling body groove.

When using a ball screw mechanism in an injection molding machine, there is thus the problem that the screw nut, provided to execute the opening and closing motions of the moving platen in a rapid manner, although being well suited for quick-action movement, has difficulty to withstand the significant loads during application of the clamping force and there is a considerable risk of wear.

SUMMARY OF THE INVENTION

It is therefore the object of the present invention, to provide screw mechanisms of the mentioned type which is simple in structure so as to be suitable also for high static loads.

This object is attained by the apparatus which includes a screw shaft, screw nut, and rolling bodies, which are in engagement in rolling body grooves of the screw shaft and the screw nut, wherein locking structures are provided in the surface of the screw shaft between the rolling body grooves and form-fittingly connectable with complementary locking structures of locking elements which are moveable substantially transversely to the axis of the screw shaft.

The invention is hereby based on the recognition to exploit the surface of the screw shaft between the rolling body grooves for locking the screw shaft at high load. In this way, there is provided a functional separation, whereby, on the one hand, the screw mechanism, provided with rolling bodies, is able to carry out the adjusting motions in a rapid manner at relatively small load, and, on the other hand, high static loads can be absorbed by locking elements which can be connected in a form-fitting manner with locking structures on the surface of the screw shaft.

According to another feature of the invention, the rolling body grooves, already provided in the screw shaft, are used as locking structures in which the locking elements can engage in a form-fitting manner.

BRIEF DESCRIPTION OF THE DRAWING

The invention will now be described with reference to exemplified embodiments. It is shown in FIG. 1 a schematic sectional view, showing part of a screw mechanism constructed according to the invention.

DETAILED DESCRIPTION OF PREFERRED EMBODIMENTS

Figure 1:
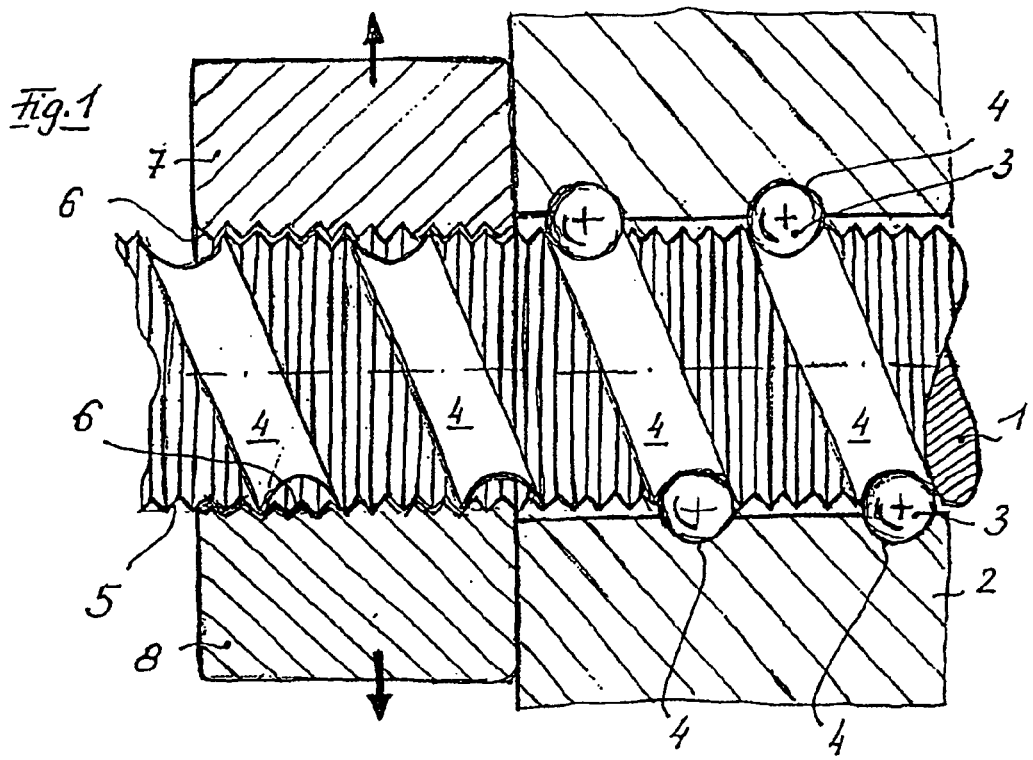

FIG. 1 shows a fragmentary illustration of a screw mechanism comprised of a screw shaft 1, screw nut 2 and rolling bodies in form of balls 3. The screw shaft 1 and the screw nut 2 are each formed with rolling body grooves 4 which may be single thread or multi-thread.

The surface of the screw shaft 1 between the rolling body grooves 4 is provided with locking structures in the form of parallel ring channels 5. Form-fittingly engaging the locking structures or ring channels 5 are complementary locking structures or projections of two locking elements 7 and 8. The locking elements 7 and 8 are movable in a direction transversely to the axis of the screw shaft 1 by means of adjustment devices (not shown).

As the locking elements 7 and 8 are pushed together—as shown—a form-fitting connection is realized with the screw shaft 1, thereby creating for the screw nut 2 a fixed stop which is able to withstand highest loads, for example the stress as a result of the clamping pressure of an injection molding machine. The rolling body assembly of the screw mechanism remains largely unaffected by these static loads so that the screw mechanism can be used in a particular suitable manner for executing exclusively rapid adjusting motions, without damaging impacts as a consequence of excessive static loads.

Figure 2:
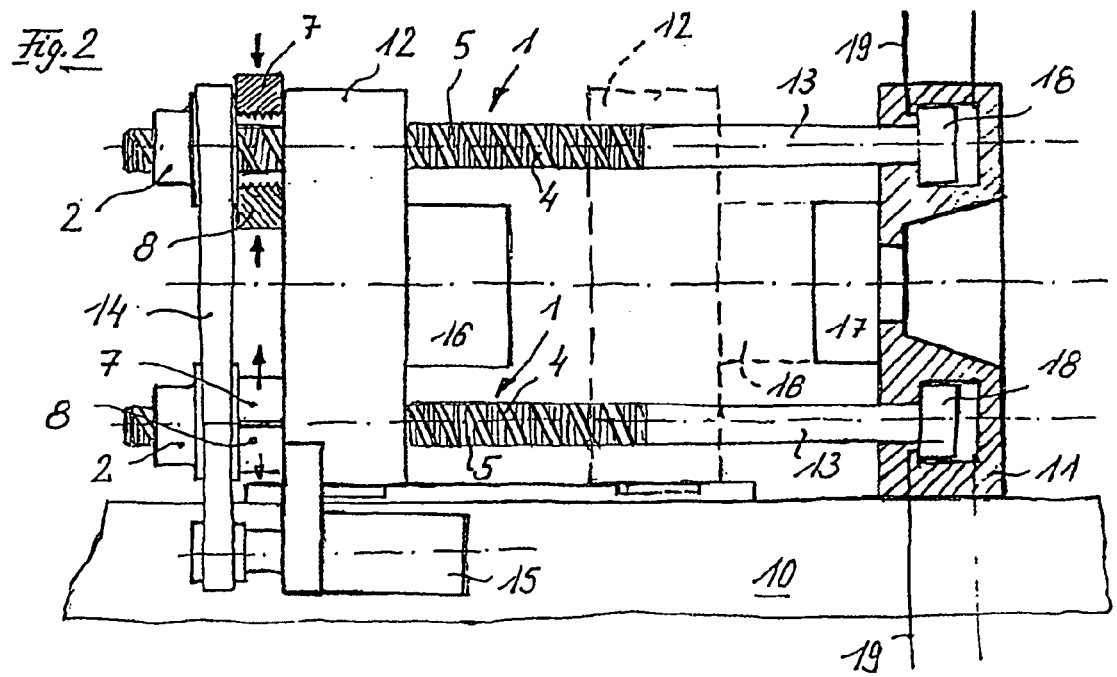
FIG. 2 is a side view of a 2-platen clamping unit of an injection molding machine.

The advantage of a functional separation between the execution of rapid adjustment motions, on the one hand, and the absorption of high static loads, on the other hand, will be even clearer from the description of the injection molding machine with reference to FIG. 2.

FIG. 2 shows the side view of a 2-platen clamping unit of an injection molding machine. Supported by the machine bed 10 are a fixed platen 11 and a moving platen 12. The platens 11, 12 are connected together via four tie bars 13, whereby only two tie bars are visible in the illustration. The tie bars 13 are formed as screw shafts at their ends extending through the moving platen 12 and correspond to the screw shafts 1 according to FIG. 1.

Mounted to the ends of the screw shaft 1, which project beyond the moving platen 12, are screw nuts 2 which are caused to rotate via a toothed belt 14 by an electric motor 15, secured to the moving platen 12. Locking elements 7 and 8 are provided between the screw nuts 2 and the moving platen 12 and—as shown at the bottom in FIG. 2—are connected in form-fitting manner with the screw shaft 1, when moved together, to thereby form a fixed axial stop for the moving platen 12.

When moved apart (shown in FIG. 2 at the top), the locking elements 7 and 8 are disengaged from the screw shaft 1 so that the moving platen 12 with half-mold 16 can be rapidly advanced toward the half-mold 17 of the fixed platen 11, as the screw nut 2 rotates, until the moving platen has reached the mold clamping position, as shown in broken line.

Subsequently, the locking elements 7 and 8 are locked with the screw shaft 1, thereby creating fixed stops for the moving platen 12, and the required clamping pressure can build up.

The buildup of the clamping pressure is implemented hydraulically through action upon the plunger 18 via the hydraulic lines 19.

The locking elements 7 and 8, which engage in the parallel ring channels 5 of the end portions of the tie bars 13 and are formed as screw shaft 1, are preferably disposed immediately behind the moving platen 12 so that the screw nuts 2 are completely relieved in the locked state and during application of the clamping pressure. The rolling bodies, typically implemented as balls, of the screw mechanism are hereby substantially unstressed.

Basically, there is also the possibility to arrange the locking element at the ends of the screw nuts 2, facing away from the moving platen 12. Also in this case, the ball screw mechanism can be kept free from stress during application of the clamping pressure because the clamping pressure is only transmitted via the screw nut body from the moving platen to the locking elements 7 and 8 which are in locked engagement with the screw shaft 1. The balls remain hereby largely unstressed.

The embodiment of a 2-platen clamping unit of an injection molding machine, shown in FIG. 2, constitutes only one possible example of application. The ball screw mechanism with the locking elements may basically also be arranged on the backside of the fixed platen.

The invention is also not limited to the application in 2-platen clamping units. The invention may equally be used in 3-platen clamping units in which the moving platen is moveable between a platen that is fixed to the machine bed, and a support platen. The screw mechanism with locking elements in accordance with the invention may hereby be arranged on the backsides of the fixed platen or the support platen on the projecting ends of the tie bars.

According to an alternative embodiment of the invention, the rolling body grooves of the screw shaft are used as locking structures in which the complementary locking elements can engage in a form-fitting manner. When the locking elements and the screw shaft are locked and secured against rotation under a high static load, like, e.g., during application of the clamping pressure of an injection molding machine, a support is created which can be subjected to high load as the ball screw mechanism is relieved.

What is claimed is:

1. A screw mechanism, comprising:
   a screw shaft defined by an axis;
   a screw nut;
   plural rolling bodies received in grooves of the screw shaft and the screw nut; and
   a locking element moveable substantially transversely to the axis of the screw shaft and having a locking structure for form-fitting connection with a complementary locking structure in the surface of the screw shaft in an area between the grooves.

2. The screw mechanism of claim 1, wherein the locking element is supported axially on the screw nut.

3. The screw mechanism of claim 1 for moving a part, wherein the locking element is supported axially on a support surface of the part, with the screw shaft extending through the support surface.

4. The screw mechanism of claim 1, wherein the grooves of the screw shaft and the screw nut are double-thread or multi-thread.

5. The screw mechanism of claim 1, wherein the rolling bodies are balls.

6. The screw mechanism of claim 1, wherein the rolling bodies are threaded rollers of a roller screw mechanism.

7. The screw mechanism of claim 1, wherein the locking structure of the screw shaft is realized by ring channels, and the complementary locking structure of the locking element is realized by projections.

8. The screw mechanism of claim 1, wherein the locking structure of the screw shaft and the locking structure of the locking element are constructed as threaded grooves with opposite pitch in relation to a pitch of the grooves for the rolling bodies.

9. The screw mechanism of claim 1, wherein there are provided two of said locking element in opposite disposition on either side of the screw shaft.

10. An injection molding machine, comprising:
    a fixed platen;
    a moving platen; and
    at least one screw mechanism which includes a screw shaft defined by an axis, a screw nut, plural rolling bodies received in grooves of the screw shaft and the screw nut, and a locking element moveable substantially transversely to the axis of the screw shaft and disposed on opposite sides of the screw shaft, with the locking element having a locking structure for form-fitting connection with a complementary locking structure in the surface of the screw shaft in an area between the grooves,
    wherein the screw shaft is constructed as a tie bar for tension-proof connection of the fixed platen and the moving platen,
    wherein the screw nut and the locking elements are arranged on the backside of one of the platens.

11. The injection molding machine of claim 10, wherein there are provided four of said screw mechanism.

12. The injection molding machine of claim 10, wherein the locking element is constructed as split locking clamps which lockingly engage in a portion of the tie bar behind the one platen.

13. An injection molding machine, comprising:
    a fixed platen;
    a moving platen;
    an end platen; and
    at least one screw mechanism arranged between the moving platen and the end plate and including a screw shaft defined by an axis, a screw nut, plural rolling bodies received in grooves of the screw shaft and the screw nut, and
    a locking element moveable substantially transversely to the axis of the screw shaft and disposed on opposite sides of the screw shaft, with the locking element having a locking structure for form-fitting connection with a complementary locking structure in the surface of the screw shaft in an area between the grooves,
    wherein the screw shaft is constructed as a pressure column, and the screw nut and the locking element are arranged on the end platen.

14. The injection molding machine of claim 13, wherein there are provided two of said screw mechanism.

15. A screw mechanism, comprising:
    a screw shaft defined by an axis;
    a screw nut;
    plural rolling bodies received in grooves of the screw shaft and the screw nut and
    at least two locking elements which are moveable transversely to the axis of the screw shaft and include locking structures, which are complementary to the grooves, wherein the screw shaft and the locking elements are each restrained in the locked position against rotation.

* * * * *